(12) United States Patent
Jacobs (10) Patent No.: US 6,271,926 B1
(45) Date of Patent: Aug. 7, 2001

(54) PRINTING SYSTEM WITH PRINT JOB PROGRAMMING CAPABILITY

(75) Inventor: Craig W. Jacobs, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/728,460

(22) Filed: Oct. 10, 1996

(51) Int. Cl.[7] .............................. B41B 15/00; B41J 15/00; H04N 1/46; G06K 9/20
(52) U.S. Cl. .................. 358/1.15; 358/1.15; 358/500; 358/468; 358/448; 382/283
(58) Field of Search ..................... 358/468, 448, 358/442, 500, 1.15; 395/1.14; 382/283

(56) References Cited

U.S. PATENT DOCUMENTS

| | | | |
|---|---|---|---|
| 4,984,072 | * | 1/1991 | Sandrew ................................ 348/132 |
| 5,204,665 | | 4/1993 | Bollman et al. ...................... 340/703 |
| 5,257,097 | * | 10/1993 | Pineau et al. ........................ 358/500 |
| 5,270,806 | | 12/1993 | Venable et al. ...................... 358/500 |
| 5,388,260 | * | 2/1995 | Monahan et al. ......................... 711/1 |

OTHER PUBLICATIONS

Inside Adobe, Photodshope, Gary Bouton, pp. 487–489, 1994.*

* cited by examiner

Primary Examiner—Edward Coles
Assistant Examiner—Twyler Lamb
(74) Attorney, Agent, or Firm—G. B. Cohen; R. Hutter (57) ABSTRACT

A job ticket generating system for a printing system is provided. The job ticket generating system includes a user interface having a display screen and a job ticket displayed on the user interface. The job ticket includes an original user feedback image, an electronically based scale settable in a plurality of positions, and an image processing subsystem for altering an appearance of the user feedback image in response to a change in the electronically based scale—the electronically based scale is set to one of the plurality of positions. The job ticket generating system further includes a library of masks with one of the masks being selected from the library of masks based on the one of the plurality of positions set with the electronically based scaled. In practice, the image processing subsystem applies the selected mask to the original user feedback so as to obtain an altered user feedback image whose appearance is changed relative to the original user feedback image.

23 Claims, 8 Drawing Sheets

PRINTING SYSTEM WITH PRINT JOB PROGRAMMING CAPABILITY

BACKGROUND

This invention relates generally to a printing system and, more particularly, to a job ticket generating system with a user feedback image that is altered dynamically, with relatively little memory usage, as a result of setting a position on an electronically based scale.

In known network printing systems, of the type disclosed in U.S. Pat. No. 5,493,634 to Bonk et al. (Issued: Feb. 20, 1996) a job is developed at a workstation and communicated to a printer adapted to render the job in a format suitable for marking. To provide the printer with print control instructions, which may be extensive, a job ticket including information regarding the attributes of the job is communicated to the printer. An example of such job ticket is illustrated by FIG. 7 of the Bonk patent.

The capabilities associated with processing a job in a network context continues to expand and, as demonstrated by U.S. Pat. No. 5,220,674 to Morgan et al. (Issued: Jun. 15, 1993), a job can be transmitted to one of a host of printers by way of a suitable server. In order to keep pace with the full range of attributes offered by network printing systems, job ticket technology has advanced accordingly. An early advancement in the area of job ticket technology can be found in U.S. Pat. No. 5,079,723 to Herceg et al (Issued: Jan. 7, 1992). The principles taught by the Herceg patent are expanded upon in patents such as U.S. Pat. No. 5,398,289 to Rourke et al. (Issued: Mar. 14, 1995).

The job tickets of Herceg and Rourke use icons to access displays for adjustment of such attributes as image quality. In particular, icons for setting image quality are selected for the purpose of showing suitable settable scales, such as a settable scale for, among other image quality attributes, darkness. For the darkness scale a selected portion is darkened with an appropriate control and a numerical value is provided. This sort of display is also commonly found for image quality attributes such as contrast and brightness.

For one known digital copier with accompanying client software, scale representations for both contrast and brightness are provided at the client. Each scale has a default or zero position, referred to as "standard" position and extreme ends for decreasing contrast/brightness (e.g. −50%) and increasing contrast/brightness (e.g. +50%). These scales are well suited for their intended purpose, namely to set contrast or brightness to one of a plurality of levels, provided the user understands how the resulting output will correspond with the various level settings. In other words without some sort of feedback image, the user is relegated to an educated guess as to how the ultimate output will correspond with the level set. It would be desirable to provide a job ticket with a user feedback image, at least for certain image quality attributes, for determining to what extent such image quality attributes will impact ultimate output.

There are systems that permit a user to observe changes in contrast of a subject image. For example, a variety of image quality attributes of an image can be observed with an editing system of the type disclosed by U.S. Pat. No. 5,204,665 to Bollman et al. (Issued: Apr. 20, 1993) and U.S. Pat. No. 5,270,806 to Venable et al. (Issued: Dec. 14, 1993). It is believed that the amount of memory space required by the approaches of Bollman and Venable is not insubstantial. For example, while the Bollman patent discloses an arrangement using a highly reduced set of colors for displaying an original image having a large number of colors, the values used at the user interface are still understood to comprehend at least 27 gray levels. The editing system of Bollman and Venable is believed to be unsuitable for use with a job ticket of the type used in many printing systems. It would be desirable to provide a way of showing the effect of image quality change on a user feedback image without overly taxing the memory constraints of a printing system in which the job ticket is intended to be employed.

Providing a suitable demonstration of contrast or brightness for a user feedback image employing relatively few gray levels while providing a wide range of incremental image quality settings is believed to present some difficulties. For example, it has been found that providing a wide range of increments for contrast or brightness setting when using relatively few gray levels can be problematic; however, under certain circumstances, lack of memory may dictate that only a relatively few gray levels are usable. It would be desirable to provide a system for showing the effects of image quality changes on a user feedback system that both uses relatively few gray levels to manipulate the user feedback image and provides a large range of incremental steps in showing the image quality changes.

Disclosures of all of the patents cited and/or discussed above in this Background are incorporated herein by reference.

SUMMARY OF THE INVENTION

In accordance with the present invention, there is provided a job ticket generating system for a printing system, the job ticket generating system comprising: a user interface having a display screen; a job ticket displayed on the user interface, said job ticket including an original user feedback image, an electronically based scale settable in a plurality of positions, and an image processing subsystem for altering an appearance of the user feedback image in response to a change in the electronically based scale, wherein the electronically based scale is set to one of the plurality of positions; a library of masks, one of the masks being selected from said library of masks based on the one of the plurality of positions set with the electronically based scaled; and said image processing subsystem, in response to setting the electronically based scale to the one of the plurality of positions, applying the selected mask to the original user feedback image so as to obtain an altered user feedback image whose appearance is changed relative to the original user feedback image.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
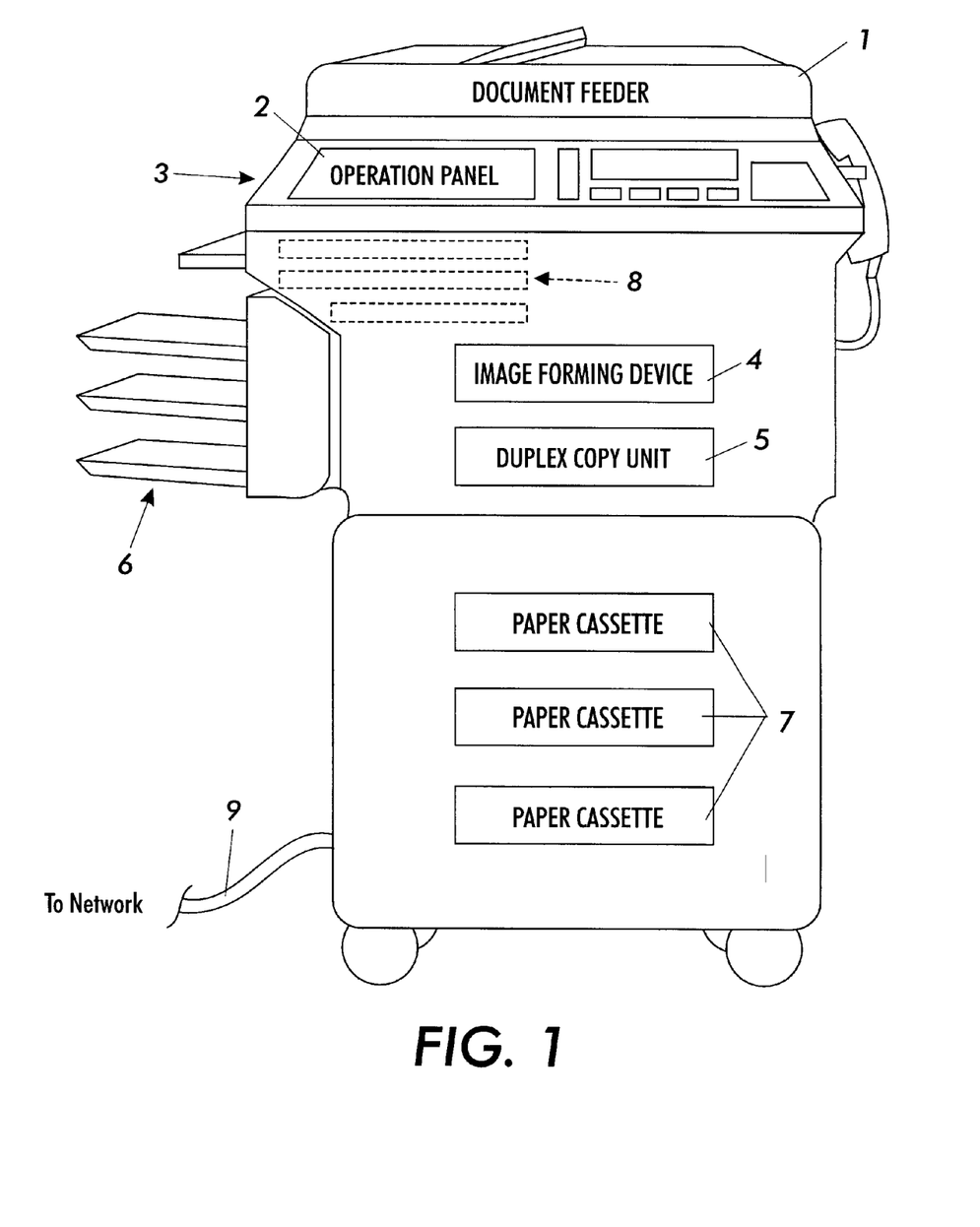
FIG. 1 is a perspective view of a networked digital copier suitable for receiving a job developed in accordance with the present invention.

Referring to FIG. 1 of the drawings, a digital copier system of the type suitable for use with the preferred embodiment is shown. As shown, the system includes a document feeder 1 and an operation (and display) panel 2. After desired conditions have been entered on the operation panel 2, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image on forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a sorter 6 in order of page or page by page.

Applications, generally 8, share the document feeder 1, operation panel 2, image reading device 3, image forming device 4, duplex unit 5, sorter 6, and paper cassettes 7 which are the resources built in the copier system. As will appear, the applications include a copier application, a printer (IOT) application, a facsimile (Fax) application and other applications. Additionally, the digital copier system is coupled with a network by way of a conventional network connection 9.

Figure 2:
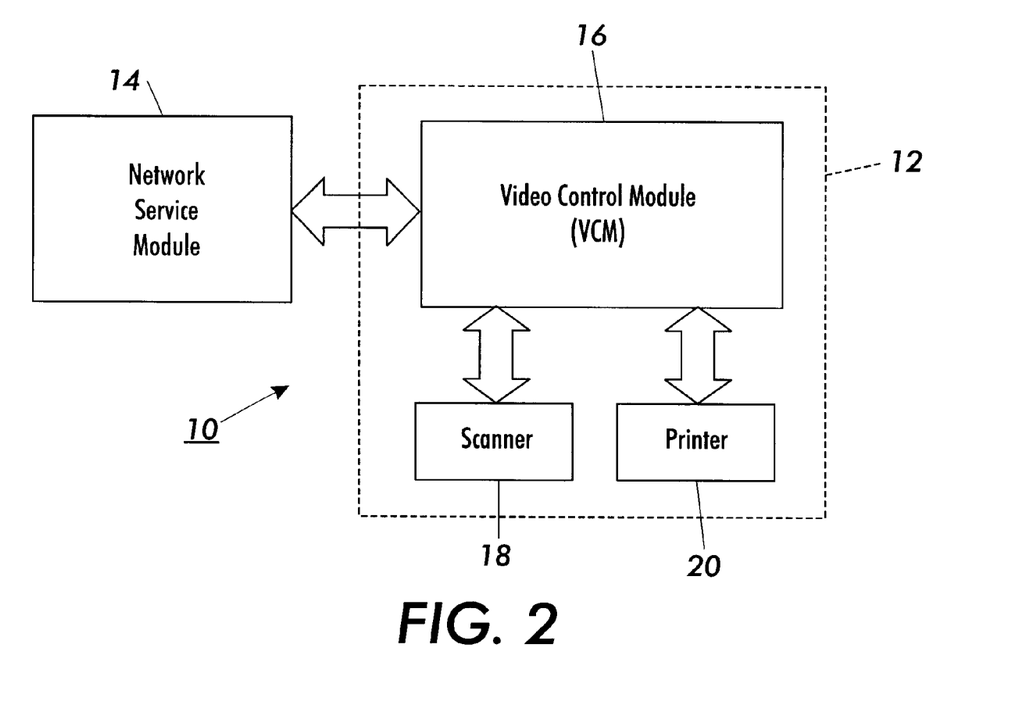
FIG. 2 is a block diagram depicting a multifunctional, network adaptive printing machine.

Referring to FIG. 2, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 3), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 3) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
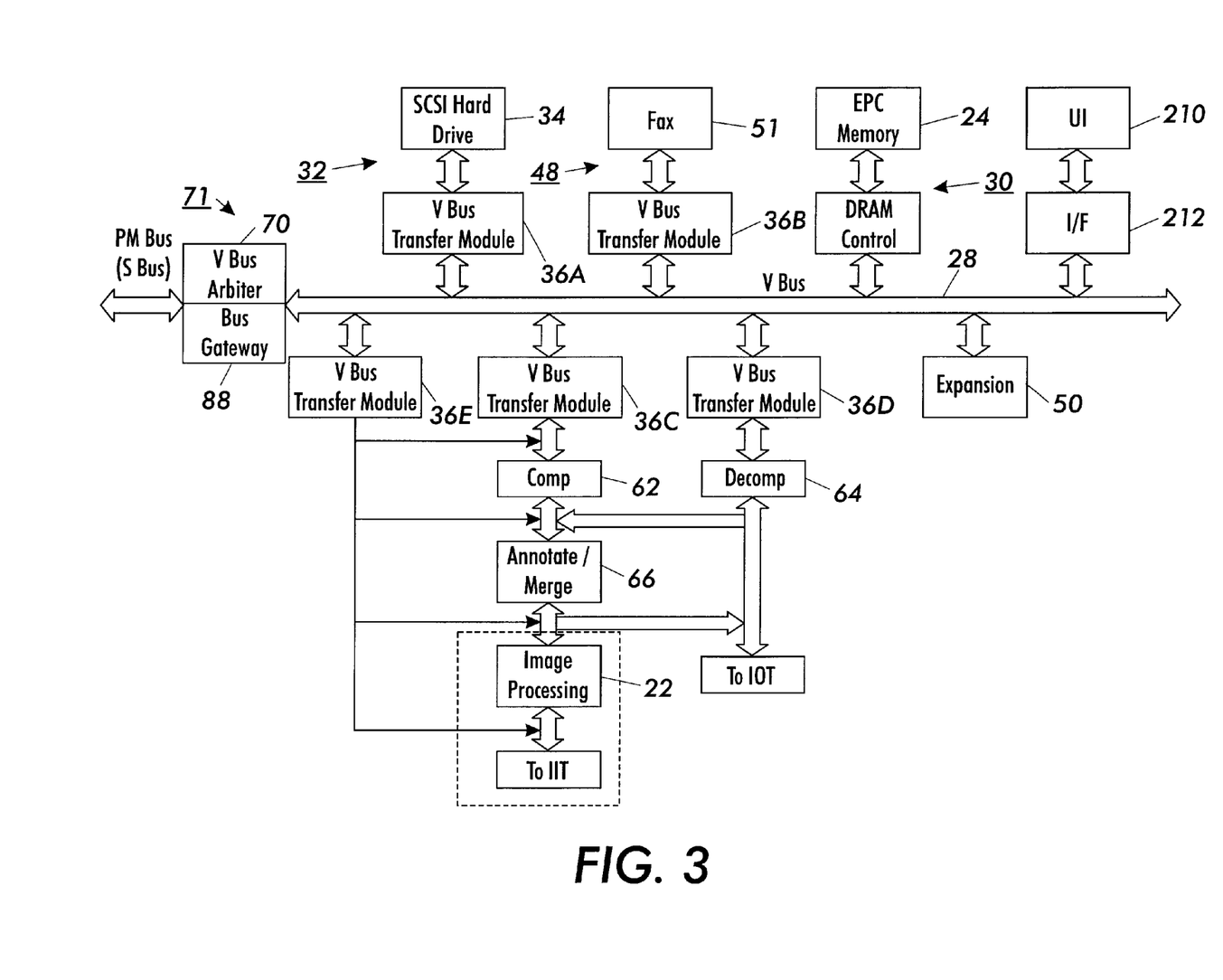
FIG. 3 is a block diagram of a video control module for the printing machine of FIG. 2.

Referring specifically to FIG. 3, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 Mbytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 4:
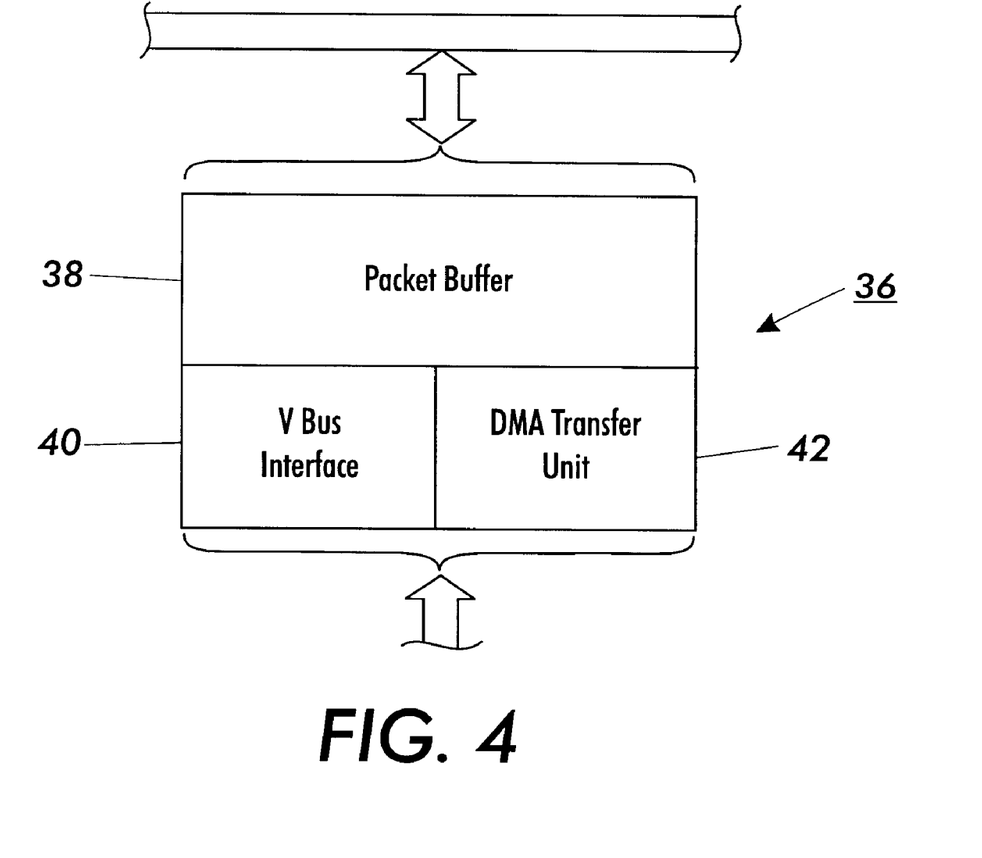
FIG. 4 is a block diagram of a transfer module used in conjunction with the printing machine of FIG. 3.

Referring to FIG. 4, the structure of one of the transfer modules 36 is discussed in further detail. The illustrated transfer module of FIG. 4 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can programmed to handle packets of up to 64 Bytes Preferably, the packet size would be reduced for times when the VBus is relatively busy and increased for times when activity on the bus is relatively low.

Figure 6:
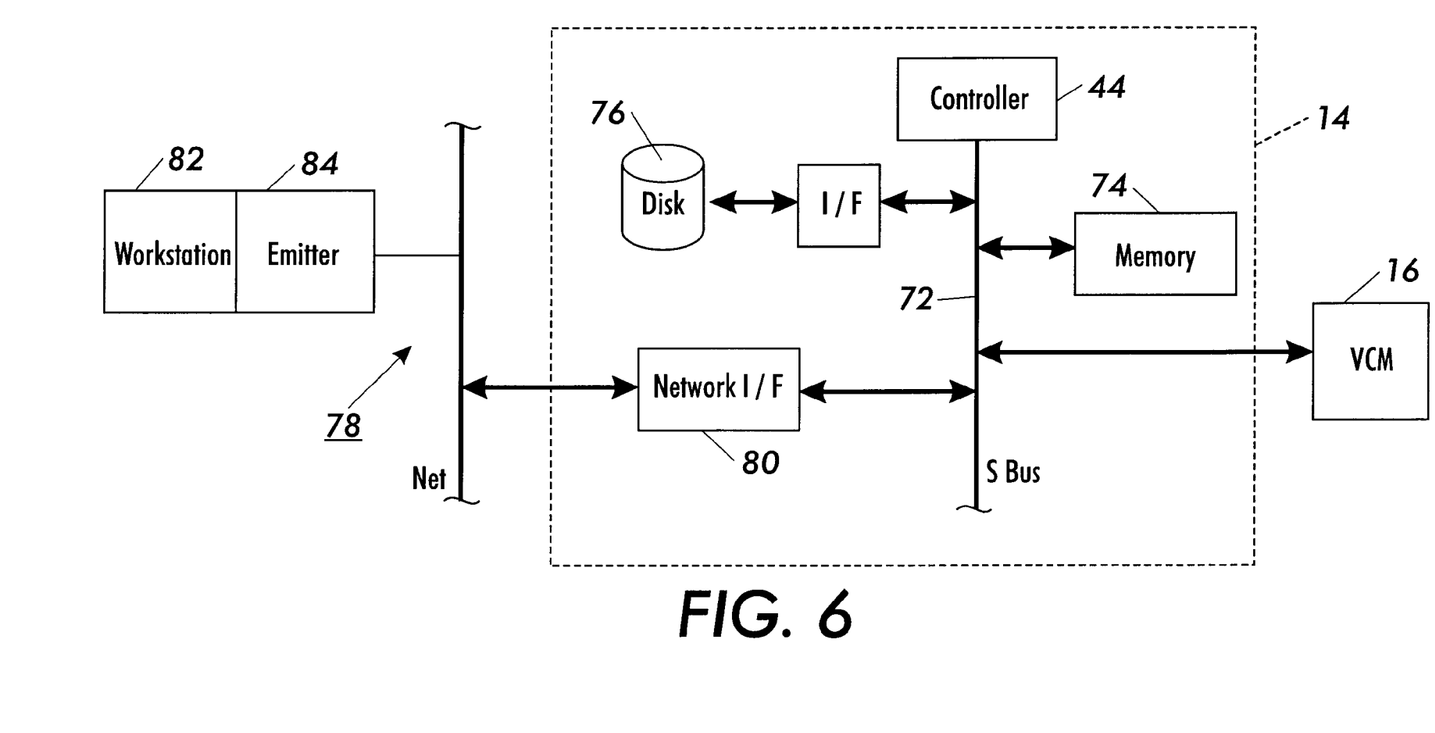
FIG. 6 is a block diagram of a network controller for the printing machine of FIG. 2.

Adjustment of the packet size is achieved with the VBus interface 40 and a system controller 44 (FIG. 6). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

More particularly, each image The DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 5:
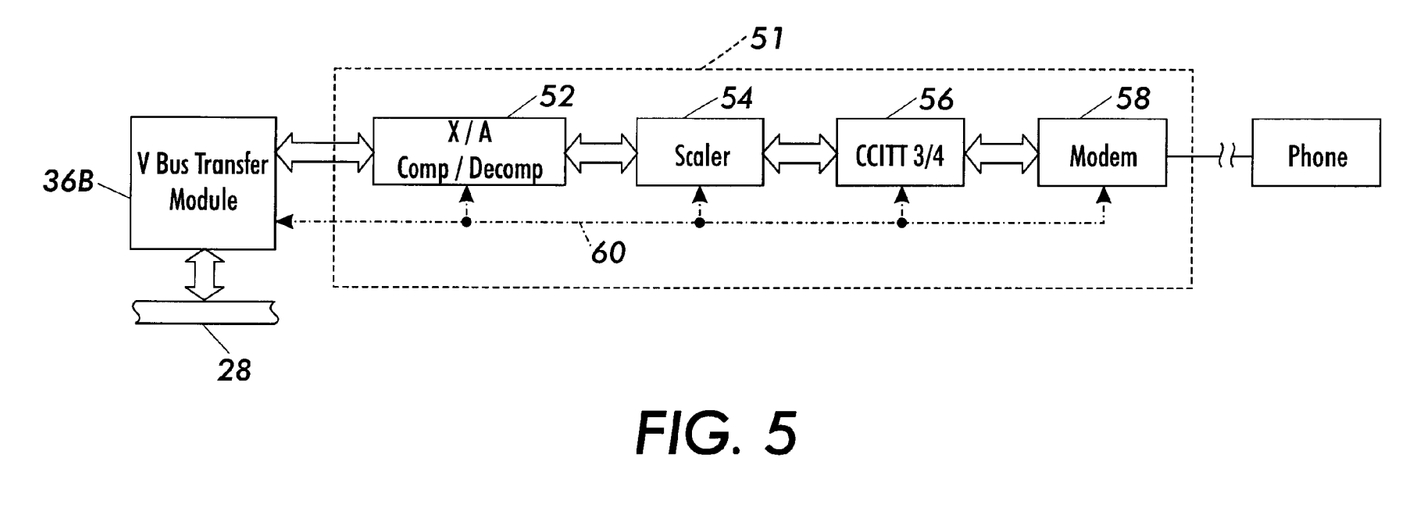
FIG. 5 is a block diagram of a facsimile card used in conjunction with the printing machine of FIG. 3.

Referring to FIGS. 2 and 3, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 5, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 5, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 3, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 3, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 3, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 6, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 6, a host memory 74, which preferably assumes the form of DRAM, and a SCSI disk drive device 76 are coupled operatively to the SBus 72. While not shown in FIG. 6, a storage or I/O device could be coupled with the SBus with a suitable interface chip. As further shown in FIG. 6, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the disclosures of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Referring again to FIG. 3, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 3, 4 and 6, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 7:
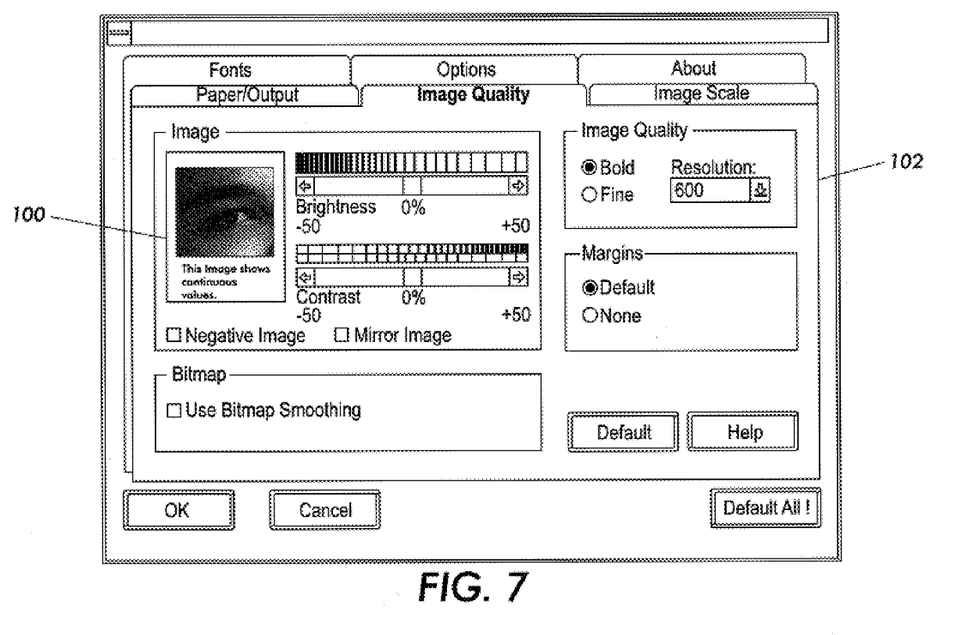
FIG. 7 is an elevational view of a screen including an image quality job ticket upon which the user feedback image resides.
Figure 8:
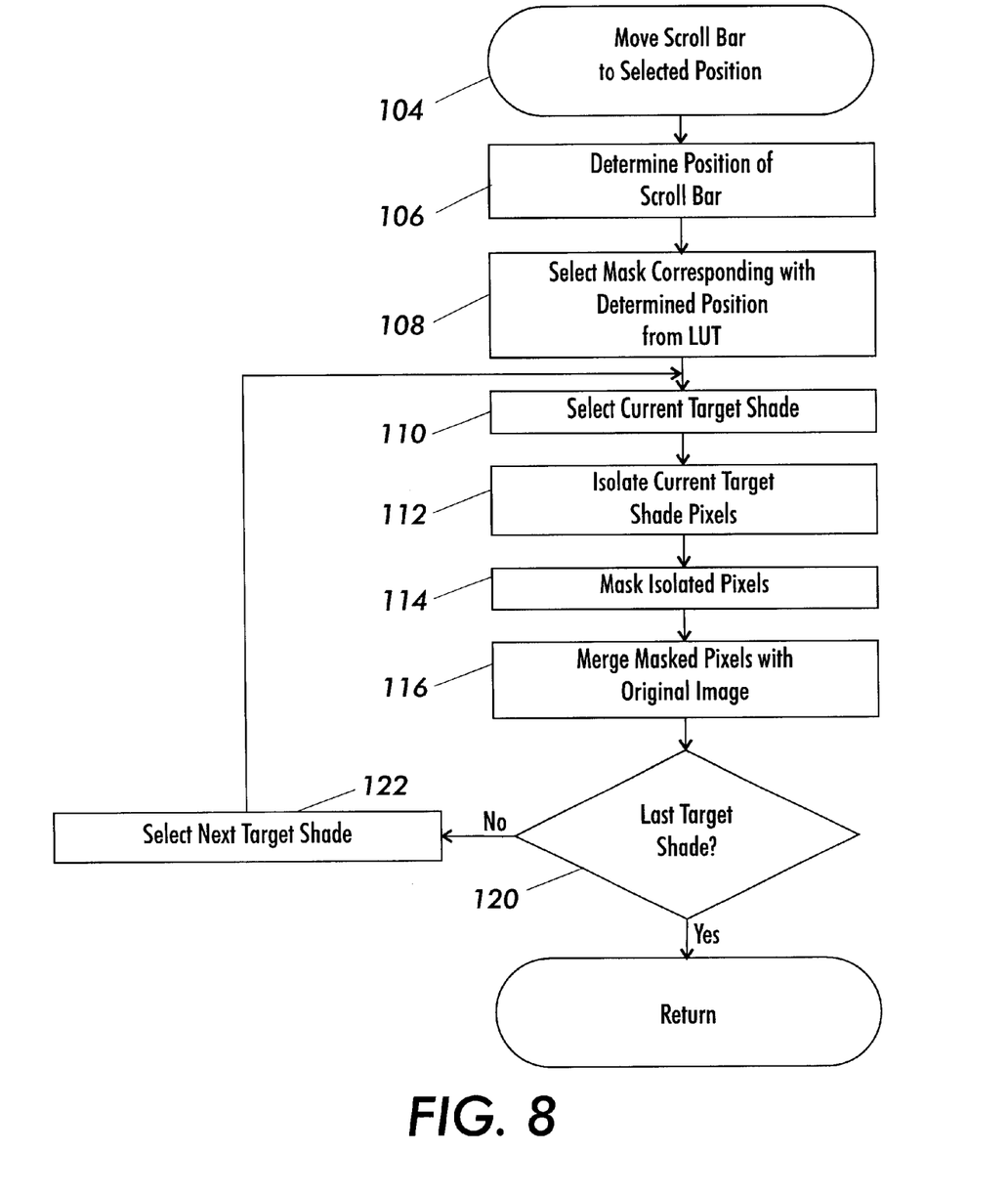
FIG. 8 is a flow diagram illustrating a technique for manipulating a user feedback image in accordance with a contrast change or brightness change indicated by a user.

Referring to FIGS. 7 and 8, a technique for enhancing use of an adjustable image processing attribute (e.g. image contrast or image brightness) in a job ticket context is shown. Referring to FIG. 7, a user feedback image 100 is shown in an image quality job ticket 102. The image quality job ticket is used to adjust selected image processing or quality attributes for a network job developed at workstation 82 (FIG. 6). In practice, the workstation is any suitable platform adapted for use with a Microsoft Windows 3.1 operating system and the digital copying machine may assume the form of a Document Centre System 35 manufactured by Xerox Corporation.

As can be observed, the image, which is intended to be representative of a typical image in the network document job, is part of a larger template, much of which template includes conventional electronically based components. For example, scales are provided for adjusting image contrast and image brightness of the job. The terms "contrast" and "brightness", as used herein are intended to assume their conventional meanings as used in the printing art area. As will appear, the contrast and brightness image processing attributes used in marking the job should vary as a function of the values set at the client job ticket. The scales are desirably used in conjunction with scroll bars to decrease or increase the respective magnitudes of the attributes. As is conventional, the various "soft" components of the job ticket are supported by a job ticket application that functions cooperatively with a controller of the workstation 82 (workstation controller not shown). Accordingly, manipulation of the user feedback image is preferably achieved with the job ticket application and the workstation controller.

It will be understood that a job at the workstation 82 is developed for transmission to a printer in accordance with conventional job compiling procedures of the type disclosed by U.S. Pat. No. 5,450,571 to Rosekrans et al. Further detail regarding development of a job is provided in now-allowed U.S. patent application Ser. No. 08/283,372 filed by Krist et al. on Aug. 1, 1994.

Referring now to FIG. 8, the approach for manipulating the user feedback image, in response to adjustment of one of the contrast and brightness scroll bars, is discussed. It will be appreciated that the case for manipulating the user feedback image for adjustment of brightness is equivalent to the case for manipulating the user feedback image for adjustments in contrast. Hence, while reference to contrast adjustment is made during the following discussion of the flow chart of FIG. 8, the discussion of FIG. 8 applies to both cases as well as adjustment of a host of other image quality parameters, such as halftoning.

Initially, the user, through use of a suitable cursor arrangement (cursor not shown) moves the contrast scroll bar (step 104) in a direction of either decreasing contrast (i.e. toward "−50") or increasing contrast (i.e. "+50"). Once the scroll bar is set at a given position for a selected time interval, a determination is made, at step 106, as to what positional value the current position relates. By reference to the positional value, a look up table ("LUT") mapping positional values with preprogrammed masks, is accessed.

An understanding of what sorts of masks reside in the LUT and how each of those masks was developed is believed to be important to an understanding of the preferred embodiment. During development of the user feedback image manipulation technique it was found that contrast could be adjusted with a single set of masks in one of two ways, according to which side of standard (0 contrast setting) the scroll bar resides. More particularly, each time the scroll bar is moved toward decreasing contrast, one of the masks is applied to the white and black pixels of the user feedback image, according to a first approach, for changing one or more white pixels to light gray pixels and one or more black pixels to dark gray pixels. On the other hand, each time the scroll bar is moved toward increasing contrast, one of the masks of the mask set is applied to the light gray and dark gray pixels of the image, according to the second approach, for changing one or more light gray pixels to white pixels and one or more dark gray pixels to black pixels.

It should be appreciated that while the currently described technique only refers to the use of four gray levels or color shades, it is contemplated that the current technique would be useful with as many as 16 gray levels. Moreover, while the currently described technique was designed for use with RGB color, it is contemplated that the basic principles of the technique would apply to the design of a comparable system with CYMK color. It is understood that, in using CYMK color, certain logical operations, the significance of which logical operations will appear below, would require adjustment to accommodate for inherent differences in RGB color and CYMK color.

In a most preferred embodiment, there is a mask stored for each incremental percentage change from standard to −50% or standard to +50%, i.e. 51 masks. In one exemplary implementation, the mask assumes a size of 8×8 pixels. It is understood that the number of masks would be greater if the increments were desired to be less than 1% or less if the increments were desired to be greater than 1%. Each mask is preferably designed to have a selected number of "active" pixels and "inert" pixels. In practice an active pixel causes a subject pixel of one shade, e.g. a white pixel, to be altered to a pixel of another shade, e.g. light gray, when the subject pixel and the active pixel are subjected to a selected logical operation, such as an ANDing operation or an ORing operation. In the illustrated embodiment, when moving toward decreasing contrast, an active pixel will cause one or more white pixels to turn light gray when subjected to an ANDing operation and/or one or more black pixels to turn dark gray when subjected to an ORing operation. On the other hand, when moving toward increasing contrast, an active pixel will cause one or more light gray pixels to turn white when subjected to an ORing operation and/or one or more dark gray pixels to turn black when subjected to an ANDing operation.

The ratio of active pixels to inert pixels in a given mask will vary as a function of the positional value with which the given mask is associated or mapped. In other words, each mask will assume a selected dither pattern corresponding with one of the positional values. For example, a mask corresponding to the positional value of −1% or +1% comprises a screen with just one active pixel, while a mask corresponding to the positional value of −50% or +50% comprises a screen with 50 active pixels. As should now appear, preferably a set of 51 distinct masks (one null mask for standard), with a linearly increasing (active pixel):(inert pixel) ratio across the set, are mapped against 51 positional values in the LUT.

Referring still to FIG. 8, in accordance with the positional value determined in step 106, a mask corresponding with that value is selected from the LUT (step 108) and a current target shade or gray level is selected at step 110. As will be appreciated by those skilled in the art, the preferred embodiment can be used in a black/white environment, in which case a gray level would be selected, or in a full color environment, in which case a shade would be selected. As will further be appreciated, the job ticket application is programmed to select target shade and as will appear, in the illustratd embodiment, the selection is made twice each time the scroll bar is moved to a new position.

In the illustrated embodiment, the first target shade is either white (if the scroll bar is on the lefthand side of standard (FIG. 7) or light gray if the scroll bar is on the righthand side of standard. At step 112, all of the first target shade pixels are isolated and buffered in a bitmap. It will be appreciated that the preferred embodiment also contemplates an approach in which the pixels are not necessarily isolated from the original image. The mask obtained by way of step 108 is, via step 114, "brushed" across the bitmap of isolated pixels. During the masking operation, the active pixels of the mask are ANDed or ORed with the isolated pixels. Subsequent to the brushing step 114, the brushed pixels are, via step 116, merged back into the original image. In most cases one or more pixels of the original image will be altered by the merging operation.

After the above-mentioned merge operation, a check is made, at step 120, to determine if another brushing of the image is required. If the only one set of isolated pixels has been brushed for a given positional value, then the mask is preferably applied to another set of isolated pixels. Accordingly, at step 122, another target shade is selected. In the illustrated embodiment, the other or second shade is either black (if the scroll bar is on the lefthand side of standard) (FIG. 7) or dark gray (if the scroll bar is on the righthand side of standard). A similar procedure to that described above is used for brushing the isolated pixels of the second shade.

The following examples will serve to illustrate further detail regarding the above-described procedure of FIG. 8:

Example 1

The scroll bar is moved to the left of standard to −10% and the following steps are followed:
1) A mask with a dither pattern corresponding with −10% is selected from the look-up table;
2) A target shade of white is selected;
3) All white pixels are isolated from the user feedback image and buffered in a bitmap;
4) The bitmap of isolated pixels is brushed with the mask, wherein white pixels are ANDed with any active pixels (i.e. white pixels) to yield light gray pixels;
5) The brushed pixels are merged back into the user feedback image;
6) A target shade of black is selected;
7) All black pixels are isolated from the user feedback image and buffered in a bitmap;
8) The bitmap of isolated pixels is brushed with the mask, wherein black pixels are ORed with any active pixels (i.e. dark gray pixels);
9) The brushed pixels are merged back into the user feedback image to provide a user feedback image with −10% contrast;

Example 2

The scroll bar is moved to the right of standard to +10% and the following steps are followed:
1) A mask with a dither pattern corresponding with +10% is selected from the look-up table;
2) A target shade of light gray is selected;
3) All light gray pixels are isolated from the user feedback image and buffered in a bitmap;
4) The bitmap of isolated pixels is brushed with the mask, wherein light gray pixels are ORed with any active pixels (i.e. white pixels) to yield white pixels;
5) The brushed pixels are merged back into the user feedback image;
6) A target shade of dark gray is selected;
7) All dark gray pixels are isolated from the user feedback image and buffered in a bitmap;
8) The bitmap of isolated pixels is brushed with the mask, wherein dark gray pixels are ANDed with any active pixels (i.e. black pixels) to yield black pixels;
9) The brushed pixels are merged back into the user feedback image to provide a user feedback image with +100% contrast;

It is contemplated that the concept underlying the above-described embodiment is advantageously employable at the digital copier sytem or printer for use in modifying portions of a stored document job. More particularly, a mask may be applied to an image portion of the document job independently of the job ticket context. In one contemplated approach, a user is provided with an electronically based scale settable in a plurality of positions. In response to selecting an image portion or bitmap from the document job and setting a position on the electronically based scale, a mask is applied to the document image portion in accordance with the procedure of FIG. 8 so that image quality of the document image portion is altered accordingly.

Numerous features of the above-described embodiment will be appreciated by those skilled in the art:

First, a user feedback image is provided for use in viewing image quality adjustments to a document job. By use of such image, the user is provided with a good "feel" as to how image quality of output of the job will appear.

Second, the user feedback image is provided a visual expression of image quality in an economical way that impacts memory resources minimally. This is particularly advantageous in printing systems where memory is placed at a premium.

Third, the algorithm used to manipulate the user feedback image is exceedingly simple and yet effective in design. Thus processing time required to manipulate the image is held to a minimum so that the user obtains a good idea as to the effect of image quality adjustments within a brief time interval.

Finally, the software is readily implemented with low cost and can be implemented readily at either the client or printer for use in either setting or modifying image processing attributes.

What is claimed is:

1. In a printing system for producing one or more prints from a document job characterized by an adjustable image processing attribute, a job ticket generating system for generating a job ticket, comprising:

a user interface having a display screen;

a job ticket displayed on the user interface, said job ticket including an original user feedback image, and an electronically based scale settable in a plurality of positions;

an image processing subsystem for altering an appearance of the original user feedback image in response to a change of setting in the electronically based scale, wherein the electronically based scale is set to one of the plurality of positions;

a library of masks, one of the masks being selected from said library of masks based on the one of the plurality of positions set with the electronically based scale, each mask in the library of masks including a pattern of pixels which alter an apparent contrast of at least a portion of the user feedback image when the pattern of pixels is superimposed on the user feedback image; and said image processing subsystem, in response to setting the electronically based scale to the one of the plurality of positions, superimposing the selected mask to the original user feedback image so as to dynamically obtain an altered user feedback image whose appearance is changed relative to the original user feedback image.

2. The job ticket generating system of claim 1, wherein the adjustable image attribute is adjusted on the basis of the one of the plurality of positions set with the electronically based scale.

3. The job ticket generating system of claim 2, wherein either an image contrast attribute or an image brightness attribute is adjusted.

4. The job ticket generating system of claim 1, in which the printing system includes a workstation communicating with a printing machine by way of a network connection, wherein said user interface is disposed at the workstation for generating said job ticket.

5. The job ticket generating system of claim 1, in which the printing system includes a workstation communicating with a printing machine by way of a network connection and the document job is developed at the workstation, wherein said user interface is disposed at the printing machine so that said job ticket is modifiable at the printing machine.

6. The job ticket generating system of claim 1, in which the image includes a set of pixels and the set of pixels includes a plurality of gray levels, wherein one of the gray levels is selected and all pixels, in the set of pixels, corresponding with the selected one of the gray levels are isolated.

7. The job ticket generating system of claim 6, wherein said one of the masks is applied to the isolated pixels in both a first pass and a second pass.

8. The job ticket generating system of claim 7, wherein a first logical operation is applied to mask the isolated pixels during the first pass and a second logical operation is applied to mask the isolated pixels in the second pass.

9. The job ticket generating system of claim 8, wherein the altered user feedback image is obtained with the isolated pixels masked by way of the first pass and the second pass.

10. The job ticket generating system of claim 6, wherein the plurality of gray levels is limited to no greater than 16 gray levels.

11. In a printing system for producing one or more prints from a document job characterized by an adjustable image processing attribute, a job ticket generating system for generating a job ticket, comprising:

a user interface having a display screen;

a job ticket displayed on the user interface, said job ticket including an original user feedback image including a set of pixels, the set of pixels including no more than 16 gray levels, and an electronically based scale settable in a plurality of positions;

an image processing subsystem for altering an appearance of the user feedback image in response to a change in the electronically based scale, wherein the electronically based scale is set to one of the plurality of positions; and said image processing subsystem, in response to the electronically based scale being set the one of the plurality of positions, dynamically altering the original user feedback image in a manner that minimizes memory usage of the printing system.

12. In a printing system for producing one or more prints from a document job including an image portion characterized by an adjustable image processing attribute, a system for adjusting the image processing attribute, comprising:

a user interface having a display screen;

an electronically based scale settable in a plurality of positions and displayable on the user interface screen;

an image processing subsystem for altering an appearance of the document job image in response to a change of setting in the electronically based scale, wherein the electronically based scale is set to one of the plurality of positions;

a library of masks, one of the masks being selected from said library of masks based on the one of the plurality of positions set with the electronically based scale, each mask in the library of masks including a pattern of pixels which alter an apparent contrast of at least a portion of the document job image when the pattern of pixels is superimposed on the document job image; and said image processing subsystem, in response to setting the electronically based scale to the one of the plurality of positions, superimposing the selected mask on the document job image so as to dynamically adjust the adjustable image processing attribute.

13. The job ticket generating system of claim 12, in which the printing system includes a workstation communicating with a printing machine by way of a network connection and the document job is developed at the workstation, wherein said user interface is disposed at the printing machine so that said document job image is modifiable at the printing machine.

14. In a printing system for producing one or more prints from a document job characterized by an adjustable image processing attribute, the printing system including a user interface having a display screen with a job ticket displayed thereon, the job ticket including an original user feedback image and an image processing subsystem for altering an appearance of the original user feedback image in response to a change in an electronically based scale, the electronically based scale being settable in a plurality of positions, a method for generating the job ticket, comprising:

adjusting the electronically based scale so that one of the plurality of positions is set;

based on the position set in said adjusting step, selecting a mask from a library of masks, each mask in the library of masks including a pattern of pixels which alter an apparent contrast of at least a portion of the user feedback image when the pattern of pixels is superimposed on the user feedback image; and superimposing the selected mask on the original user feedback image, with the image processing subsystem, so as to obtain an altered user feedback image whose appearance is changed relative to the original user feedback image.

15. The method of claim 14, further comprising adjusting the adjustable image attribute on the basis of the one of the plurality of positions set in said adjusting step.

16. The method of claim 15, wherein said adjusting includes adjusting either an image contrast attribute or an image brightness attribute.

17. The method of claim 15, in which the printing system includes a workstation communicating with a printing machine by way of a network connection, further comprising disposing the user interface at the workstation for performing said method thereat.

18. The method of claim 15, in which the printing system includes a workstation communicating with a printing machine by way of a network connection and the document job is developed at the workstation, further comprising disposing the user interface at the printing machine so that said method is performable at the printing machine.

19. The method of claim 14, in which the image includes a set of pixels and the set of pixels includes a plurality of gray levels, further comprising selecting one of the gray levels and isolating all pixels, in the set of pixels, corresponding with the selected one of the gray levels.

20. The method of claim 19, wherein said applying step includes applying the mask to the isolated pixels in both a first pass and a second pass.

21. The method of claim 20, further comprising using a first logical operation to mask the isolated pixels during the first pass and a second logical operation to mask the isolated pixels in the second pass.

22. The method of claim 21, wherein said applying step includes obtaining the altered user feedback image with the isolated pixels masked by way of the first pass and the second pass.

23. The method of claim 19, further comprising limiting the plurality of gray levels to no greater than 16 gray levels.

* * * * *